United States Patent
Locke

(10) Patent No.: US 8,971,391 B2
(45) Date of Patent: Mar. 3, 2015

(54) SYSTEMS AND METHODS FOR EQUALIZING RETRANSMISSION DELAYS FOR DATA RETRANSMISSION OVER BONDED MODEMS

(75) Inventor: Mike Locke, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 154 days.

(21) Appl. No.: 13/251,079

(22) Filed: Sep. 30, 2011

(65) Prior Publication Data

US 2013/0083830 A1     Apr. 4, 2013

(51) Int. Cl.
*H04B 1/38*    (2006.01)
*H04L 1/18*    (2006.01)
*H04L 5/14*    (2006.01)
*H04L 1/00*    (2006.01)

(52) U.S. Cl.
CPC ............ *H04L 1/1822* (2013.01); *H04L 1/1829* (2013.01); *H04L 5/14* (2013.01); *H04L 2001/0096* (2013.01)
USPC ........... 375/222; 375/219; 375/220; 375/221; 714/748

(58) Field of Classification Search
CPC ............................................. H04Q 2213/13039
USPC ................................. 375/219–222; 714/748
See application file for complete search history.

(56) References Cited

U.S. PATENT DOCUMENTS

| 2009/0089638 A1* | 4/2009 | Heise et al. ................. 714/748 |
| 2009/0313517 A1* | 12/2009 | Schedelbeck et al. ........ 714/748 |
| 2011/0072327 A1* | 3/2011 | Schoppmeier et al. ....... 714/749 |
| 2011/0235692 A1* | 9/2011 | Kanellakopoulos et al. . 375/222 |
| 2012/0269289 A1* | 10/2012 | Schenk ......................... 375/296 |

FOREIGN PATENT DOCUMENTS

WO    WO2011018190    *    2/2011    ............... H04B 3/32

OTHER PUBLICATIONS

"Improved Impulse Noise Protection for DSL Transceivers", Series G: Transmission Systems and Media, Digital Systems and Networks, G.998-4 of the Telecommunication Standardization Sector of the ITU, Jun. 2010, 78 pages.

* cited by examiner

*Primary Examiner* — Daniel Washburn
*Assistant Examiner* — Eboni Hughes
(74) *Attorney, Agent, or Firm* — Sterne, Kessler, Goldstein & Fox PLLC

(57) ABSTRACT

Embodiments of the present invention provide systems for incorporating bonding processors while avoiding bonding processor buffer overflow by initiating retransmission requests on all data lines whenever corrupted data is encountered on one data line. Initiating these "extra" retransmission requests equalizes retransmissions delays over all transmission lines, preventing the bonding processor from receiving excess data that cannot be reassembled until the retransmission request is processed.

23 Claims, 5 Drawing Sheets

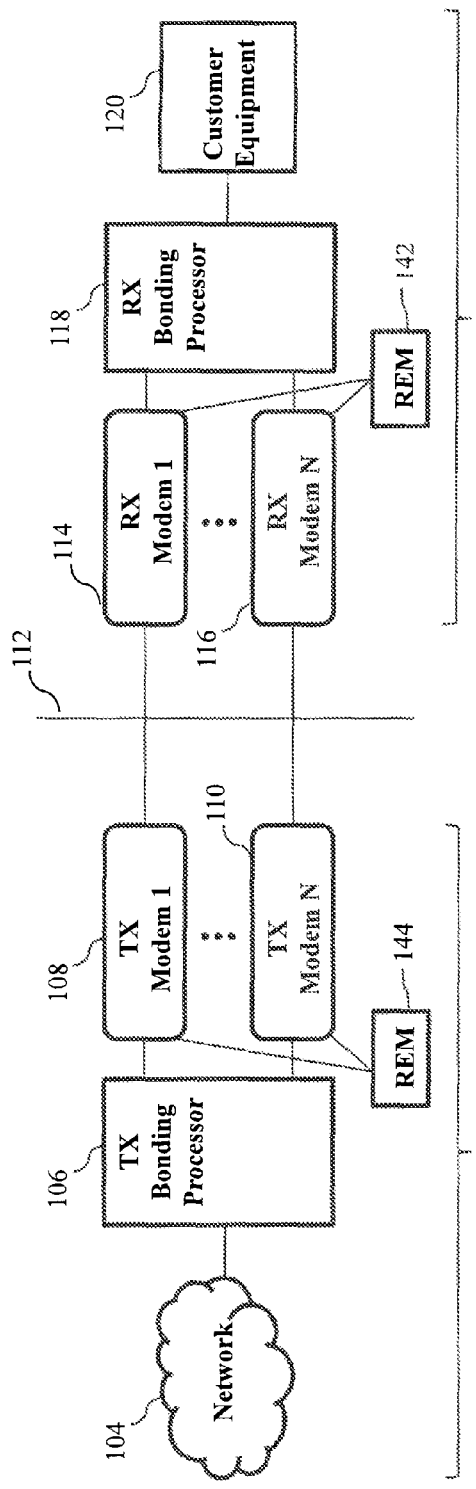
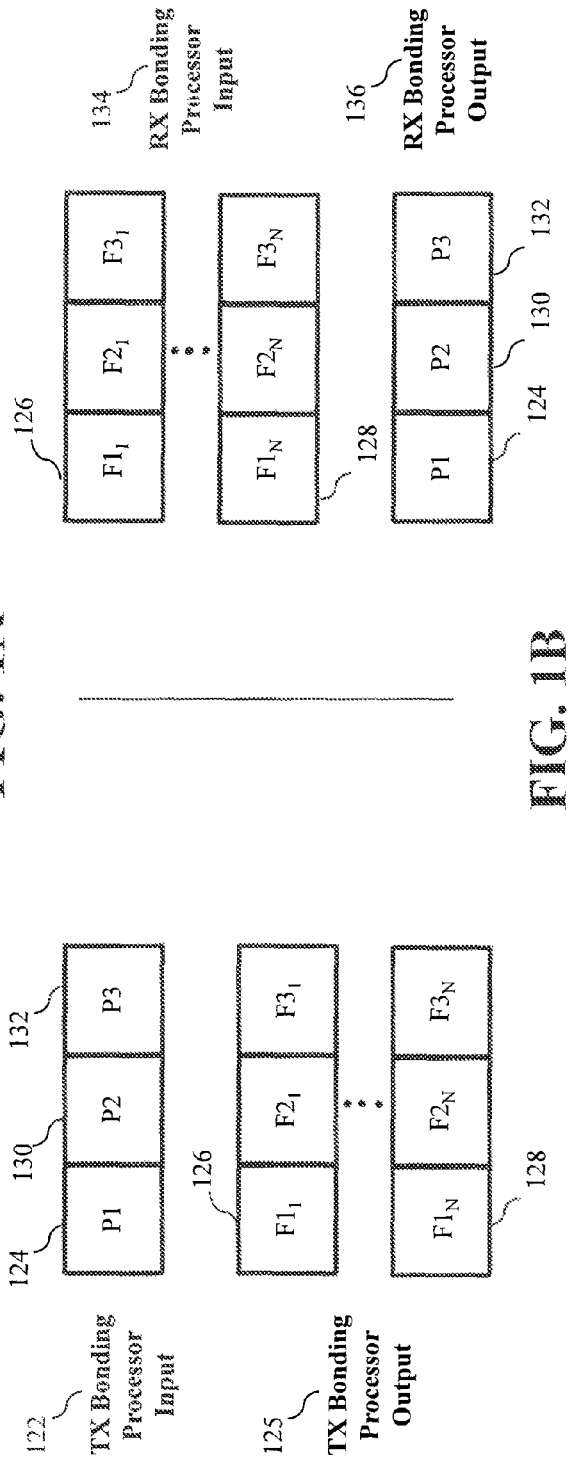
FIG. 1A
FIG. 1B

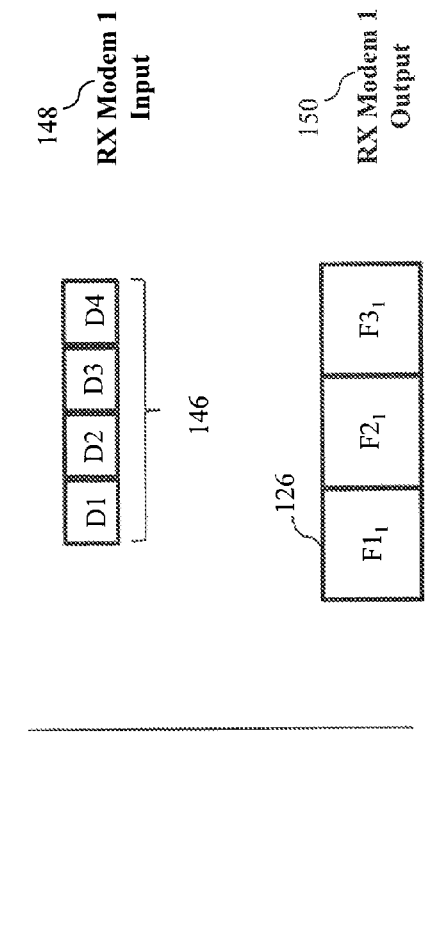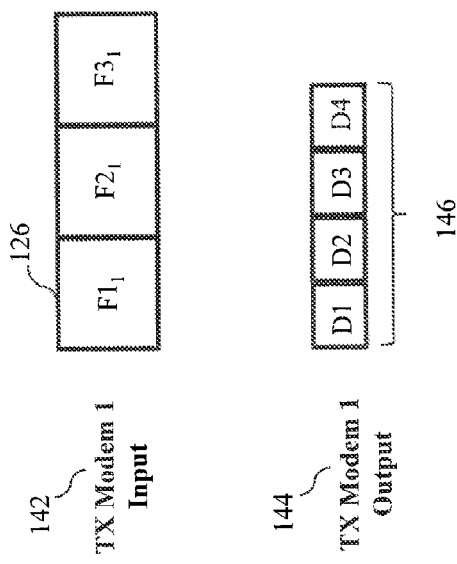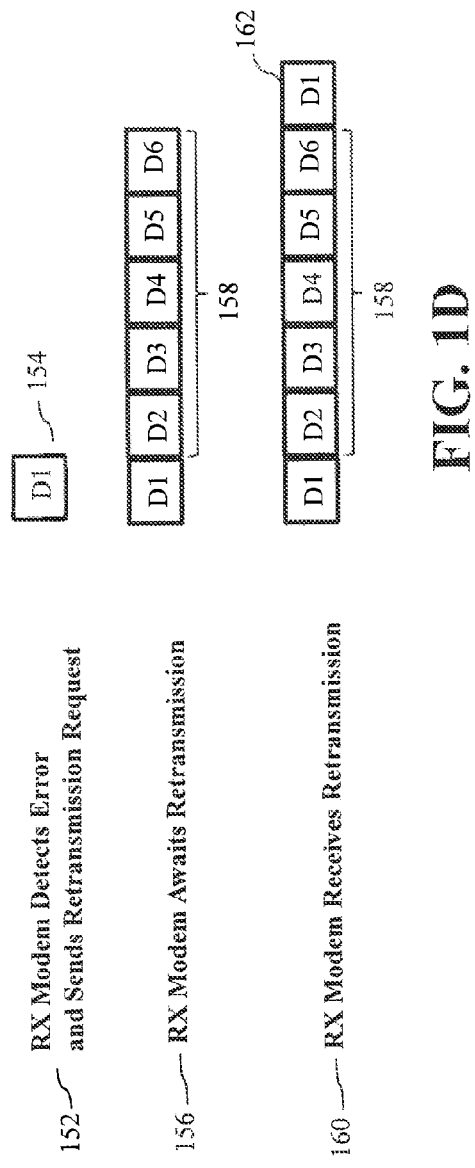
FIG. 1C
FIG. 1D

SYSTEMS AND METHODS FOR EQUALIZING RETRANSMISSION DELAYS FOR DATA RETRANSMISSION OVER BONDED MODEMS

FIELD OF THE INVENTION

This invention relates to data communications and more specifically to data rate matching.

BACKGROUND OF THE INVENTION

Bonding processors can be used to combine the functionality of two modems (e.g., DSL modems) into a system that appears as one modem to an end user.

Previous bonding processor implementations resulted in bonding processor buffer overflows when retransmission requests were initiated.

What is needed are methods and systems for preventing bonding processor buffers from overflowing without causing a significant reduction in data rate.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, serve to explain the principles of the present invention. In the drawings:

FIG. 1A is a block diagram of a system for equalizing retransmission in accordance with an embodiment of the present invention.

FIG. 1B is a block diagram illustrating packet fragmentation and reassembly in accordance with an embodiment of the present invention.

FIG. 1C is a block diagram illustrating data transmission unit (DTU) fragmentation and reassembly in accordance with an embodiment of the present invention.

FIG. 1D is a diagram illustrating retransmission of corrupted DTU's in accordance with an embodiment of the present invention.

Figure 2:
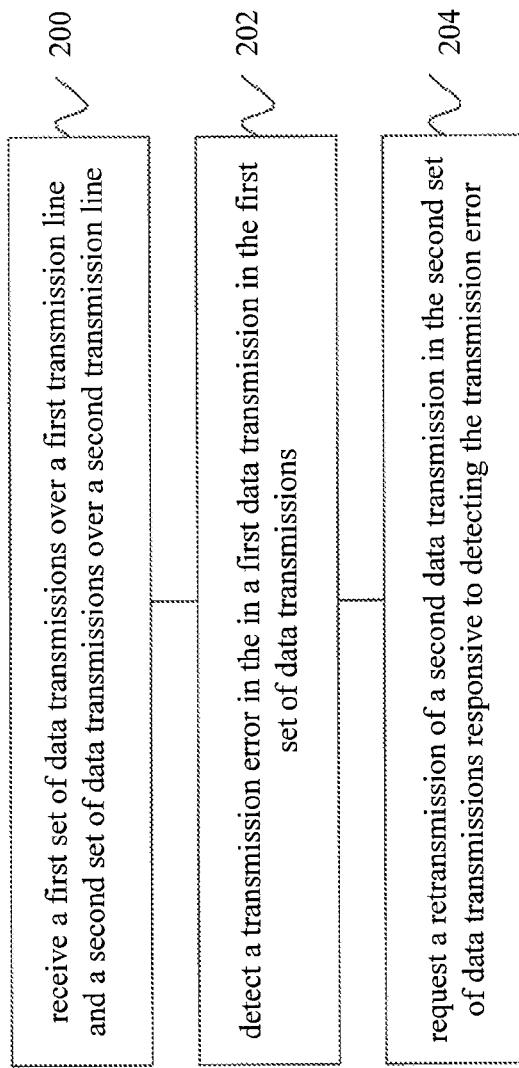
FIG. 2 is a flowchart of a method for equalizing retransmission at data reception equipment in accordance with an embodiment of the present invention.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

In the following description, numerous specific details are set forth to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Bonding processors can be used to combine the functionality of two modems (e.g., DSL modems) into a system that appears as one modem to an end user. For example, a bonding processor can be used to take a stream of packets sent from a network and break it into two (or more) streams of packet fragments for transmission over two modems. These streams can be reassembled into the original stream by another bonding processor before the information is transmitted to an end user. Splitting up a single data stream into multiple, simultaneously transmitted data streams can improve performance (e.g., by increasing data transmission speed).

If an error occurs while the packet fragments are being transmitted, this error is detected by a reception modem, and the reception modem can initiate a retransmission request (e.g., according to the ITU recommendation G.998.4 "Ginp") to the transmission modem to send replacement data for the data that was corrupted during transmission. Retransmission requests can introduce additional delay because a reception modem may not be able to properly process incoming packets until the retransmission of corrupted data has been processed. Many steps taken to compensate for this retransmission delay introduce unattractive complications (e.g., requiring large memory buffers or lowering the data rate).

The use of multiple data streams can introduce additional complications for bonding processors when errors occur during data transmission. For example, a bonding processor may need to reassemble a packet from fragments that are transmitted over multiple data streams. A transmission error due to corrupted data in any one of these streams can cause the bonding processor to delay reassembling data from all streams while the corrupted data is retransmitted. However, while the data retransmission is being processed, data continues to flow to the bonding processor over all streams, which can cause buffers in the bonding processor to overflow.

Embodiments of the present invention provide solutions to this bonding processor buffer overflow problem by initiating retransmission requests on additional (e.g., all) data lines whenever corrupted data is encountered on one line. Initiating these "extra" retransmission requests equalizes retransmissions delays over all transmission lines, preventing the bonding processor from receiving excess data that cannot be reassembled until the retransmission request is processed. Thus, embodiments of the present invention advantageously provide systems and methods for utilizing bonding processors to increase data transmission performance while avoiding potential bonding processor buffer overflows caused by errors in data transmission (e.g., due to noise in a transmission medium) over one stream.

Because the transmission lines are bonded together via bonding processors, it is reasonable to expect that data transmitted over these transmission lines will encounter similar and simultaneous impulse noise over many or all of the transmission lines. As a result, initiating "extra" retransmission requests has a minimal impact on performance (e.g., data rate) because it is reasonable to expect that data corruption encountered in one line of a plurality of bonded transmission lines also occurred in one or more of the other bonded lines due to the same error-inducing event. Thus, embodiments of the present invention advantageously provide solutions to the bonding processor buffer overflow problem discussed above while minimally impacting performance.

2. Systems

2.1 System Elements

A system for equalizing retransmission delays in accordance with an embodiment of the present invention will now be described with reference to FIG. 1A. FIG. 1A is a block diagram representing data transmission equipment 100 (e.g., equipment at a service provider) and data reception equipment 102 (e.g., equipment installed at the home of a customer). In FIG. 1A, data is sent from a network 104 to a transmission (TX) bonding processor 106. TX bonding processor 106 splits this data into one or more streams to increase data transmission performance (e.g., transmission speed).

Each of these data streams is transmitted simultaneously over parallel lines to data reception equipment 102. In an embodiment of the invention illustrated by FIG. 1A, each of these data streams is transmitted by a different modem (e.g., TX modem 108 and TX modem 110). In an embodiment, TX modem 108 and TX modem 110 are Digital Subscriber Line (DSL) modems. While two transmission modems are illustrated in FIG. 1A, it should be understood that data can be split into any number of streams for transmission to data reception equipment 102 using any number of transmission modems. For example, in an embodiment of the present invention, data sent from network 104 is divided into fragments sent over four separate streams, and each of these four streams is simultaneously transmitted to data reception equipment 102 using four separate transmission modems.

Data transmission equipment 100 simultaneously transmits the data streams to data reception equipment 102 over a medium 112. Medium 112 can be any medium for transmitting data (e.g., the Internet, WiFi, a cable, etc.). Data reception equipment 102 receives these simultaneously transmitted steams using, for example, a plurality or reception (RX) modems (e.g., DSL modems). While FIG. 1A show two reception modems (RX modem 114 and RX modem 116), it should be understood that any number of RX modems can be used to receive data. For example, in a system using four streams for data transmission, four RX modems can be used to receive the data. In an embodiment, RX modems 114 through 116 are coupled to TX modems 108 through 110 over a bidirectional communication link.

Data received by RX modems 114 through 116 is reassembled into the data stream that was transmitted from network 104 using RX bonding processor 118. RX bonding processor 118 can then transmit the reassembled data to customer equipment 120 (e.g., a customer's home computer). More specifically, TX bonding processor 106 divides a data stream into fragments, and RX bonding processor 118 reassembles this data stream from the transmitted fragments, before passing them on to customer equipment 120.

It should be understood that the elements of FIG. 1A described above can be implemented on the same integrated circuit (IC) or on separate ICs. For example, in an embodiment, TX bonding processor 106 and TX modems 108 through 110 can be implemented on the same IC. Likewise in an embodiment, RX modems 114 through 116 and RX bonding processor 118 can be implemented on the same IC. Further, in an embodiment, TX modems 108 through 110 are implemented on the same IC (but on a separate IC from the IC implementing TX bonding processor 106), and RX modems 114 through 116 are implemented on the same IC (but on a separate IC from the IC implementing RX bonding processor 118).

2.2 Packet Fragmentation and Reassembly

Packet fragmentation and reassembly in accordance with an embodiment of the invention will now be described with reference to FIG. 1B. FIG. 1B is a block diagram illustrating how TX bonding processor 106 breaks data 122 received from network 104 into fragments 125 to be output to TX modems 108 through 110. FIG. 1B further illustrates how RX bonding processor 118 receives data fragments 134 from RX modems 114 through 116 and reassembles these fragments 134 into the original packets 136 sent by network 104 before these packets 136 are transmitted to customer equipment 120.

FIG. 1B shows three exemplary packets 124, 130, and 132 received by TX bonding processor 106 from network 104. TX bonding processor 106 breaks each of these packets into separate fragments for simultaneous transmission over TX modems 108 through 100. For example, TX bonding processor 106 breaks packet P1 124 into fragments $F1_1$ 126 through $F1_N$ 128.

In an embodiment, TX bonding processor 106 includes information in each fragment indicating an order of reassembly to be utilized by RX bonding processor 118 when reassembling the fragments into packets. For example, fragment $F1_1$ 126 can include information indicating that it should be placed before fragment $F1_N$ 128 when RX bonding processor 118 reassembles these fragments into packet P1 124. This information can be included, for example, in a header or footer appended to each fragment.

The transmitted fragments are received and reassembled by RX bonding processor 118. For example, RX bonding processor 118 reassembles fragments $F1_1$ 126 through $F1_N$ 128 into packet P1 124. As previously discussed, RX bonding processor 118 reassembles fragments in order based on information appended to the fragments. Because different fragments of the same packet can be transmitted over separate streams, an error (e.g., corrupted data) that occurs on any one of the transmission streams can prevent RX bonding processor 118 from reassembling the packet until the data containing the error is retransmitted.

For example, in FIG. 1B, packet P1 124 is reassembled by RX bonding processor 118 from fragments $F1_1$ 126 through $F1_N$ 128. In an embodiment, RX bonding processor 118 has to reassemble fragments $F1_1$ 126 through $F1_N$ 128 in a proper order. For example, RX bonding processor 118 has to properly receive fragment $F1_1$ 126 before it can process $F1_N$ 128 because fragment $F1_N$ 128 contains information indicating that it should be placed behind fragment $F1_1$ 126 when RX bonding processor 118 reassembles packet P1 124.

According to an embodiment of the present invention, a series of fragments is further divided into smaller units (e.g., into a series of data transmission units, or "DTUs") by transmission modems before they are received by reception modems. For example, in an embodiment, a series of fragments is divided into DTUs of differing sizes. Each DTU can contain several fragments, a piece of a fragment, or portions of multiple fragments. For example, one DTU may contain a piece of a first fragment, an entire second fragment, and a piece of a third fragment.

In an embodiment, each of these DTUs is appended with information indicating an order of reassembly (e.g., a sequence identification, or "SID"), and a reception modem uses this information to properly reassemble the DTUs into fragments. Thus, an error occurring in any DTU of a fragment can delay reassembly of the entire fragment. DTU error detection and retransmission is described in greater detail below.

If a DTU was corrupted during transmission, the reception modem initiates a retransmission request over the transmission line that sent this DTU. For example, if RX modem 114 received a corrupted DTU, then RX modem 114 requests a retransmission of the corrupted DTU from TX modem 108. This retransmission takes additional time to process because of the time required for the retransmission request to reach TX modem 108 and the time required for TX modem 108 to send the replacement DTU back to RX modem 114.

While the retransmission request is being processed, RX modems 114-116 can continue to receive data. Because at least some of this data cannot be properly reassembled until the retransmission of the corrupted data reaches RX modem 114, RX modem 114 stores this data for later processing (e.g., in buffers). Thus, data can begin to collect in the buffers of RX modem 114. After the corrupted data has been retransmitted to RX modem 114, RX modem 114 can begin to reassemble the data with the rest of the data that has collected in its buffers while the retransmission was being processed. RX modem 114 can then transmit this reassembled data to RX bonding processor 118.

However, while a retransmission is being processed for one modem (e.g., for RX modem 114) other RX modem(s) (e.g., RX modem 116) can continue to reassemble data (e.g., DTUs) into fragments and forward these fragments to bonding processor 118 for reassembly into packets. For example, RX modem 116 may forward fragment $F1_N$ 128 to bonding processor 118. However, as previously discussed, RX bonding processor 118 reassembles fragments into packets in a particular order of assembly. For example, RX bonding processor 118 reassembles fragments into packets according to the original order of transmission of these fragments by TX bonding processor 106. If RX bonding processor 118 is waiting for a transmission of a DTU from RX modem 114 that contains information from fragment that was transmitted earlier (e.g., fragment $F1_1$ 126), RX bonding processor 118 cannot properly reassemble fragments that were transmitted later (e.g., fragment $F1_N$ 128) until the retransmission is processed and RX modem 114 sends the DTU that contains the information from the earlier fragment (e.g., fragment $F1_1$ 126). Thus, retransmission delays in RX modems 114 through 116 can cause fragments to collect in the buffers of bonding processor 118, which can eventually lead to a buffer overflow in bonding processor 118. The potential for buffer overflow in bonding processor 118 can be especially high if a large number of RX modems 114 through 116 are bonded together via RX bonding processor 118.

One potential solution to this problem is to delay sending data from RX modem 114 (and/or additional RX modem(s)) to RX bonding processor 118 until the data rate reaches a speed that RX bonding processor 118 can properly process, given its memory requirements. However, lowering the data rate in a system incorporating bonding processors is especially disadvantageous because bonding processors are frequently used to attempt to increase data rate. Further, RX modem 114 (and/or additional RX modem(s)) may also have memory limitations. Embodiments of the present invention solve this buffer overflow problem by incorporating a retransmission equalization module (REM) 142 or 144 into one or more portions of data reception equipment 102 and/or data transmission equipment 100.

Another problem can arise when "old" data collects in the buffers of TX bonding processor 106. For example, in an embodiment, each DTU is also appended with a timestamp, which can be used to enforce configured minDelay and maxDelay parameters (e.g., parameters for setting limits for transmission delays as described in the G.998.4 recommendation). According to the G.998.4 recommendation, it should be sufficient to set minDelay to be equal to maxDelay to avoid overflowing the buffers of RX bonding processor 118. The maxDelay parameter is typically configured to be large (typically 20 mSec) to allow good retransmission performance. However, this claim in the G.998.4 recommendation is based on 2 false assumptions: (1) that the RX modem 114 has enough memory to implement a large minDelay at a high data rate and (2) that TX bonding processor 106 has no fragment buffers. If TX bonding processor 106 has fragment buffers, the time stamps on the DTUs may not reflect when the data was fragmented, and this can cause the Ginp receiver (e.g., RX modem 114) to delay output of a DTU that contains information from "old" fragments.

For example, if RX modem 114 encounters a maxDelay long error event (e.g., as described by the G.998.4 recommendation), RX modem 114 requests retransmissions for maxDelay time. During this time, one or more fragments collect in the buffers of TX bonding processor 106. Once the error event stops, RX modem 114 starts receiving "good" DTUs and begins reassembling them. Initially, RX modem 114 receives "old" DTUs from fragments that TX bonding processor 106 has been trying to send for maxDelay time. Because these DTUs are "old" and have "old" timestamps, they are sent to RX bonding processor 118 immediately. Eventually, RX bonding processor 118 receives "new" DTUs, but these "new" DTUs can contain information from "old" fragments. Because these DTUs are "new" and have "new" timestamps, the RX modem 114 delays output of the DTUs for minDelay time. In the meantime, another RX modem (e.g., RX modem 116) may have output data that requires information from fragments from the "new" DTUs that contain "old" data. This situation can also cause the buffers of RX bonding processor 118 to overflow.

Embodiments of the present invention provide solutions to this problem by incorporating a REM into portions of data transmission equipment 100. By initiating one or more additional retransmissions on one or more additional transmission lines whenever a retransmission request is received, embodiments of the present invention avoid the buffer overflow issues in RX bonding processor 118 described above because delays are equalized across all transmission lines.

2.3 Retransmission Equalization Module

In an embodiment, REM 142 is a hardware, software, or firmware module that initiates one or more retransmission requests to mimic the delay that occurs on one transmission line (e.g., due to a retransmission of data) on one or more additional transmission lines, such that delays are equalized across all transmission lines. For example, if an error is detected in a DTU received by RX modem 114, RX modem 114 sends a retransmission request to TX modem 108. In accordance with embodiments of the present invention, REM 142 initiates one or more additional retransmission requests to TX modem 110 even though no error was detected by RX modem 116. In an embodiment, REM 142 initiates enough additional retransmission requests such that the delay caused by the processing of the retransmission from TX modem 110 is equivalent to the delay caused by processing the additional retransmissions (e.g., from TX modem 110) initiated by the additional retransmission requests. These additional retransmission requests equalize delays due to retransmission processing time on all data lines so that additional fragments do not continue to be forwarded to bonding processor 118 after a retransmission has been initiated on one data line. By equalizing delays on all transmission lines whenever a retransmission request is sent across one transmission line, REM 142 reduces the potential for buffer overflow in RX bonding processor 118, because fewer fragments are allowed collect in the buffers of RX bonding processor 118 while a retransmission is being processed on any data line.

For example, REM 142 can detect that a transmission error occurred in a DTU. Because RX modem 114 will issue a retransmission request to TX modem 108 for another copy of the corrupted DTU, REM 142 initiates one or more matching retransmission request to TX modem 110 so that both RX modem 114 and RX modem 116 "wait" an approximately equivalent amount of time to receive retransmitted data before forwarding fragments to bonding processor 118 while the retransmission from TX modem 110 is being processed. Thus, by sending this matching retransmission request, REM 142 equalizes retransmission time on all data lines.

In an embodiment, REM 142 can be configured to initiate all retransmission requests (and not simply initiate matching retransmission requests after an RX modem has initiated a retransmission request). For example, if an error is detected by RX modem 114, REM 142 can be configured to initiate retransmission requests to all of TX modems 108 through 110. Thus, in this embodiment, none of RX modems 114 through 116 send retransmission requests.

Additionally, while REM 142 is shown in FIG. 1A as being coupled to RX modems 114 through 116, it should be understood that one or more REM(s) 142 can also be implemented on the same IC as any, some, or all of RX modems 114 through 116 in accordance with embodiments of the present invention. Further, in an embodiment, REM 142 is implemented on the same IC as bonding processor 118. In another embodiment, REM 142 is implemented on a separate IC from any of the elements of data reception equipment 102.

A retransmission equalization module can also be implemented on data transmission equipment 100 (e.g., shown in FIG. 1A as REM 144). For example, in an embodiment, REM 144 is a hardware, software, or firmware module coupled to one or more of TX modems 108 through 110. When REM 144 detects a retransmission request sent to one modem (e.g., sent to TX modem 108) from data reception equipment 102, REM 144 initiates a matching retransmission of data so that retransmission delays are equalized across all data lines. For example, if REM 144 detects a retransmission request sent to TX modem 108, TX modem 108 sends a retransmission of data, and REM 144 initiates a matching retransmission of data from TX modem 110. In an embodiment, REM 144 initiates both the retransmission of data from TX modem 108 and the retransmission of data from TX modem 110.

Further, while FIG. 1A shows REM 144 as being implemented on a separate IC from the rest of the elements of data transmission equipment 100, it should be understood that REM 144 can also be implemented on the same IC as any, some, or all of TX modems 108 through 110 in accordance with embodiments of the present invention. It should also be understood that REM 144 can be implemented on the same IC as TX bonding processor 106.

2.4 Retransmission of Data Transmission Units

Data transmission unit (DTU) fragmentation and reassembly in accordance with an embodiment of the present invention will now be explained with reference to FIG. 1C. As previously discussed, each transmission modem can break fragments into smaller portions (e.g., into packet transfer mode (PTM) codewords, cells, and/or DTUs) before transmitting them to a corresponding reception modem. For example, FIG. 1C shows fragments 142 input to TX modem 108 from TX bonding processor 106. In an embodiment, TX modem 108 breaks these fragments into DTUs. For example, TX modem breaks fragment $F1_1$ 126 into DTUs D1 through D4 146 before outputting 144 these DTUs 146 to RX modem 114. RX modem 114 receives 148 DTUs D1 through D4 146. If no errors are detected, RX modem 114 reassembles DTUs D1 through D4 146 into fragment $F1_1$ 126 and outputs 150 fragment $F1_1$ 126 to RX bonding processor 118. As TX modem 108 continues to transmit DTUs to RX modem 114, RX modem 114 continues to reassemble these DTUs into fragments and outputs 150 the fragments to RX bonding processor 118. As previously discussed, the order of reassembly of the DTUs is based on data appended to each DTU indicating its reassembly priority (e.g., the SID). While FIG. 1C shows fragment $F1_1$ 126 being broken into DTUs D1 through D4, it should be understood that any number of fragments can be broken up into any number of DTUs in accordance with embodiments of the present invention and that each DTU can contain several fragments, a piece of a fragment, or portions of multiple fragments.

DTU error detection and retransmission will now be explained with reference to FIG. 1D. FIG. 1D illustrates different events that occur when an error is detected in a received DTU. In step 152, an RX modem (e.g., RX modem 114) detects an error in DTU D1 154 and sends a retransmission request for D1 154 to the corresponding transmission modem (e.g., TX modem 108). In step 156, RX modem 114 awaits retransmission of DTU D1 154. While the retransmission is being processed, additional DTUs (e.g., DTUs D2 through D6 158) begin to collect in the buffers of RX modem 114. RX modem 114 cannot properly reassemble DTUs D2 through D6 158 because DTU D1 154 has a higher priority. Thus, DTUs D2 through D6 158 are stored until DTU D1 154 is retransmitted. In step 160, RX modem 114 receives the retransmission 162 of DTU D1 154 and can then properly continue reassembling DTUs into fragments.

As previously discussed, while a retransmission is being processed for an RX modem (e.g., RX modem 114), other RX modems (e.g., RX modem 116) continue to transmit fragments assembled from other received DTUs to RX bonding processor 118. If RX bonding processor 118 needs a fragment from RX modem 114 (e.g., fragment $F1_1$ 126) before it can reassemble the fragment(s) sent from RX modem 116, buffer overflow is possible, because additional fragments can continue to collect in the buffers of RX bonding processor 118 while it is waiting for fragment $F1_1$ 126.

According to embodiments of the present invention a REM (e.g., REM 142 or 144) initiates one or more additional retransmissions of DTUs to other TX modems (e.g., to TX modem 110) so that delays are equalized across all transmission lines. In an embodiment, the additional retransmissions of DTUs are retransmissions for "dummy" DTUs containing no data. By equalizing delays across all transmission lines, unwanted buffer overflow in RX bonding processor 118 is avoided.

2.5 Delay Equalization Without Initiating Additional Retransmission Requests In an embodiment of the present invention, each modem (e.g., TX modems 108 through 110 and RX modems 114 through 116) have a Packet Transfer Mode ("PTM") encapsulation module. PTM is a mode designed to provide a low-overhead mechanism for transmitting packets over DSL links. When TX bonding processor 106 sends fragments to a transmission modem, TX bonding processer 106 sends these fragments to the PTM encapsulation module in the transmission modem. When a transmission modem receives a retransmission request, the PTM encapsulation module of this transmission modem temporarily stops taking fragments from TX bonding processor 106 while the retransmission request is processed. For example, if TX modem 108 receives a request to retransmit DTU D1 154, the PTM encapsulation module of TX modem 108 temporarily stops taking fragments from TX bonding processor 106. While data (e.g., fragments) has temporarily stopped flowing to TX modem 108, data continues to flow to other transmission modems (e.g., TX modem 110). This continued flow of data on one or more transmission lines while data has stopped flowing across one transmission line can cause delay discrepancies among the transmission lines and can eventually lead to an overflow in the buffers of RX bonding processor 118.

Embodiments of the present invention provide additional solutions to equalize retransmission delays across all data lines to prevent these delay discrepancies without altering the processing of retransmission requests. In an embodiment, when a transmission modem (e.g., TX modem 108) receives a request to retransmit data (e.g., a request to retransmit DTU D1 154) and the PTM encapsulation module of TX modem 108 stops taking fragments from TX bonding processor 106, TX bonding processor 106 is instructed (e.g., by a hardware, software, or firmware module coupled to TX bonding processor 106) to temporarily halt transmission of fragments to one or more additional transmission modems (e.g., to TX modem 110) while the retransmission is being processed. Alternatively, in an embodiment, this module can instruct the one or more additional transmission modems (e.g., TX modem 110) to stop receiving fragments from TX bonding processor 106 while the retransmission is being processed. After TX modem 108 processes the retransmission, the PTM encapsulation module of TX modem 108 can resume receiving fragments. TX bonding processor 106 detects the ability of the PTM encapsulation module of TX modem 108 to receive fragments and resumes transmitting fragments to TX modem 108. The hardware, software, or firmware module coupled to TX bonding processor 106 detects this resumption of fragment transmission to TX modem 108 and instructs TX bonding processor 106 to resume sending fragments to the one or more additional TX modems (e.g., to TX modem 110) as well. By temporarily halting transmission of fragments over one or more additional data lines whenever a retransmission is being processed for one line, embodiments of the present invention advantageously avoid the buffer overflow problem due to continued transmission of "old" data in DTUs described above.

In an embodiment, when a reception modem (e.g., RX modem 114) initiates a retransmission of data (e.g., a request to retransmit DTU D1 154), one or more additional reception modems (e.g., RX modem 116) are temporarily instructed (e.g., via by a hardware, software, or firmware module coupled to one or more reception modems) to instruct the corresponding transmission modem to stop receiving fragments from TX bonding processor 106 while the retransmission is being processed. In an embodiment, if RX modem 114 sends a retransmission request, RX modem 116 is instructed to send an All Idle Out-of-synch ("AIOOS") to TX modem 110 to temporarily instruct the PTM encapsulation module of TX modem 110 to stop taking fragments from TX bonding processor 106 while the retransmission is processed. After RX modem 114 receives the retransmission, RX modem 116 is instructed to stop transmitting the AIOOS so TX modem 110 can continue to receive fragments from TX bonding processor 106.

Thus, some embodiments of the present invention enable equalization of delays across multiple transmission lines without requiring any additional retransmission requests. In an embodiment, the hardware, software, or firmware module that instructs TX bonding processor 106 to temporarily halt transmission of fragments while a retransmission is being processed is implemented on the same IC as REM 144, and the hardware, software, or firmware module that instructs one or more additional reception modems to temporarily send an AIOOS while a retransmission is being processed is implemented on the same IC as REM 142. However, it should be understood that the delay equalization modules described in this section may, but do not necessarily, incorporate functionality for requesting one or more additional retransmissions of data.

2.6 Additional Embodiments

REM 142 (and/or REM 144) may also be further configured to account for additional considerations when sending additional retransmission requests in accordance with some embodiments of the present invention. For example, depending on the hardware of any two modems, delays between these two modems may vary (e.g., one modem may process packets faster than the other modem), and these delays can negatively impact performance. In an embodiment, REM 142 is configured to detect these delay variations and compensate for them by requesting a retransmission of a fewer or greater number of DTUs so that the effective data rates over each transmission line are effectively matched.

For example, DTUs transmitted over one transmission line may not be the same size (e.g., bit length) as DTUs transmitted across one or more other transmission lines. DTUs transmitted by TX modem 108 and DTUs transmitted by TX modem 110 may be different sizes (e.g., due to hardware differences between TX modem 108 and TX modem 110). Further, the bit rate of TX modem 108 may differ from the bit rate of TX modem 110. Embodiments of the present invention provide additional mechanisms for compensating for these additional factors (e.g., DTU size and bit rate differences among modems) when initiating additional retransmission requests. For example, in an embodiment, REM 142 (or REM 144) attempts to match DTU size and/or bit rate when initiating additional retransmissions.

Some embodiments of the present invention match the percentage of bit rate degradation caused by retransmission over different transmission lines. Thus, if line X (e.g., the line between TX modem 108 and RX modem 114) must retransmit k % of its total bandwidth to correct errors, line Y (e.g., the line between TX modem 110 and RX modem 116) should also request retransmission of k % of its total bandwidth. When both line X and line Y have errors to correct, the line with the higher percentage of errors dictates the value of k.

Some embodiments of the present invention provide a shared accumulator to implement bit rate matching. Each time line X requests a retransmission, the accumulator is incremented by $L_{DTU}(lineX)/L(lineX)$, and each time line Y requests a retransmission the accumulator is decremented by $L_{DTU}(lineY)/L(lineY)$, where $L_{DTU}$ represents the bit length of the DTU being retransmitted, and L is the number of bits per discrete multi-tone (DMT) symbol. If the accumulator is larger than a line Y threshold, line Y will start requesting extra retransmissions. If the accumulator is smaller than a line X threshold, line X will start requesting extra retransmissions. In an embodiment, "extra" retransmissions are counted the same as normal retransmissions relative to updating the accumulator. In an embodiment, the smallest stable line Y threshold is MAX($L_{DTU}$(lineX)/L(lineX), $L_{DTU}$(lineY)/L(lineY))*0.5, and the largest stable line X threshold is the negative of the smallest stable line Y threshold. There is some latitude to "tune" the thresholds, since the true constraint is (line Y threshold−line X threshold)>=MAX($L_{DTU}$(lineX)/L(lineX), Ldtu(lineY)/L(lineY)). In an embodiment, each line keeps an accumulator, and the difference between the accumulators are examined to determine if any extra retransmissions need to be requested.

In an embodiment, the output of data from one line is delayed if it has gotten too far ahead of the other line (e.g., determined based on the SID that is applied to each DTU). This applies a "back pressure" on the Ginp receive state machine, first causing it to use the receive retransmission storage to try to match the delay of the lines, and when that is not sufficient, it forces extra retransmission requests (e.g., because as new data arrives but there is no place to store it, a retransmission request is sent). This "back pressure" mechanism has a long delay associated with it, and that can result in oscillating retransmission requests between the lines. In an embodiment, the oscillation is damped out by disallowing line X from delaying output for a period of time after line Y has been forced to delay output.

In another embodiment, RX bonding processor 118 is instructed (e.g., by REM 142 or REM 144) to stop taking data when its buffer has reached capacity. This is fed back to the Ginp receive state machine as "backpressure" that can cause the same reaction as described above.

3. Methods

A method for equalizing retransmission in accordance with an embodiment of the present invention will now be described with reference to FIG. 2, FIG. 1A and FIG. 1D. In step 200, a first set of data transmissions is received over a first transmission line, and a second set of data transmissions is received over a second transmission line. For example, RX modem 114 receives a first set of DTUs from TX modem 108, and RX modem 116 receives a second set of DTUs from TX modem 110.

In step 202, a transmission error is detected in a first data transmission in the first set of data transmissions. For example, a transmission error is detected (e.g., by RX modem 114, and/or REM 142) in a DTU (e.g., in DTU D1 154). In step 204, a retransmission is requested for a second data transmission in the second set of data transmissions responsive to detecting the transmission error. For example, REM 142 initiates a retransmission of a DTU from TX modem 110. In an embodiment, this retransmission from REM 142 is initiated simultaneously with a retransmission initiated to replace corrupted DTU D1 154. By simultaneously initiating a retransmission from both TX modem 108 and TX modem 110, retransmission delays are equalized across both data lines, which avoids potential buffer overflow in bonding processor 118.

Figure 3:
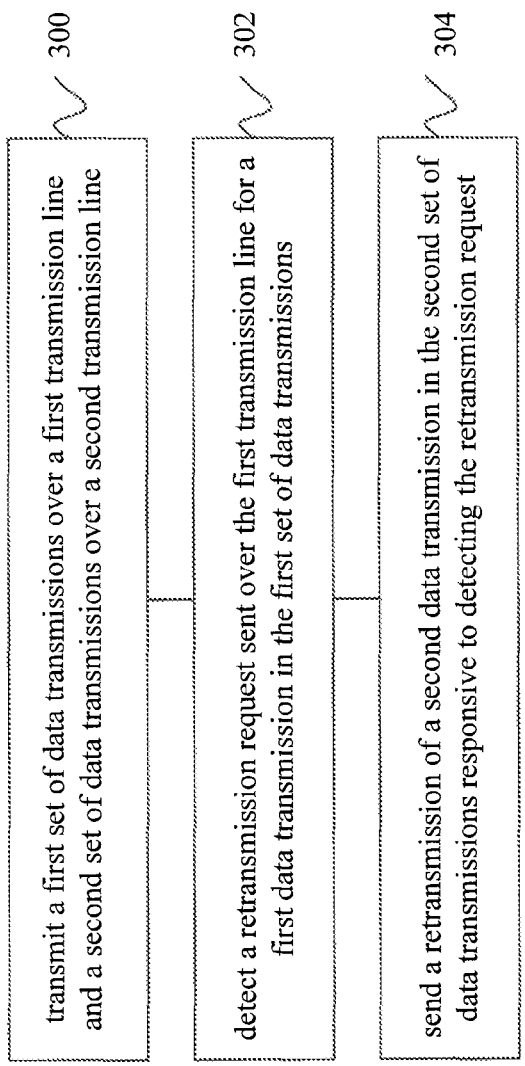
FIG. 3 is a flowchart of a method for equalizing retransmission at data transmission equipment in accordance with an embodiment of the present invention.

Another method for equalizing retransmission in accordance with an embodiment of the present invention will now be described with reference to FIG. 3, FIG. 1A and FIG. 1D. In step 300, a first set of data transmissions is transmitted over a first transmission line, and a second set of data transmissions is transmitted over a second transmission line. For example, a first set of DTUs is transmitted by TX modem 108, and a second set of DTUs is transmitted by TX modem 110. In step 302, a retransmission request sent over the first transmission line is detected. For example, a retransmission request sent to TX modem 108 is detected (e.g., by TX modem 108 and/or REM 144) for DTU D1154.

In step 304, a retransmission of a second data transmission in the second set of data transmissions is sent responsive to detecting the retransmission request. For example, REM 144 initiates a retransmission of a DTU. In an embodiment, this retransmission from REM 144 is initiated simultaneously with a retransmission initiated to replace the DTU D1 154. By simultaneously initiating a retransmission from both TX modem 108 and TX modem 110, retransmission delays are equalized across both data lines, which avoids potential buffer overflow in bonding processor 118.

Figure 4:
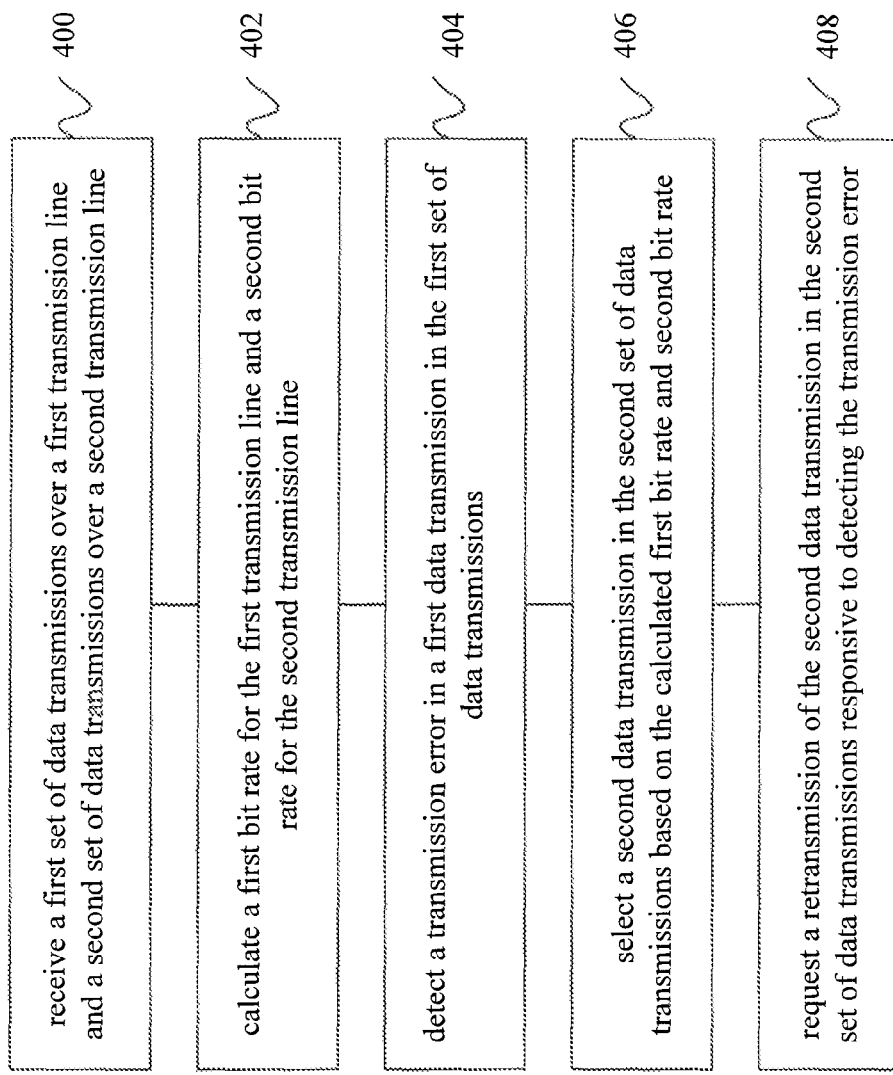
FIG. 4 is a flowchart of another method for equalizing retransmission at data reception equipment in accordance with an embodiment of the present invention.

Another method for equalizing retransmission in accordance with an embodiment of the present invention will now be described with reference to FIG. 4, FIG. 1A and FIG. 1D. In step 400, a first set of data transmissions is received over a first transmission line, and a second set of data transmissions is received over a second transmission line. For example, RX modem 114 receives a first set of DTUs from TX modem 108, and RX modem 116 receives a second set of DTUs from TX modem 110.

In step 402, a first bit rate of the first transmission line and a second bit rate over the second transmission line are determined. For example, the bit rate of data sent from RX modem 114 is determined (e.g., by REM 142 and/or RX modem 114), and the bit rate of data sent from RX modem 116 is determined (e.g., by REM 142 and/or RX modem 116). In step 404, a transmission error is detected in a first data transmission in the first set of data transmissions. For example, a transmission error is detected (e.g., by RX modem 114 and/or REM 142) in a DTU (e.g., DTU D1154).

In step 406, a second data transmission in the second set of data transmissions is selected based on the calculated first bit rate and second bit rate. For example, REM 142 may determine that the bit rate of data sent from RX modem 114 is faster than the bit rate of data sent from RX modem 116. When REM 142 selects one or more DTUs for retransmission, REM 142 selects DTUs so that the data rates across both transmission lines are effectively matched.

In step 408, a retransmission is requested for the second data transmission responsive to detecting the transmission error. In an embodiment, this retransmission from REM 142 is initiated simultaneously with a retransmission initiated to replace corrupted DTU D1 154 By simultaneously initiating a retransmission from both TX modem 108 and TX modem 110, and by selecting one or more DTUs for retransmission based on the determined bit rates of the data lines, retransmission delays are equalized across all data lines, which avoids potential buffer overflow in bonding processor 118.

4. Conclusion

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology of terminology herein is for the purpose of description and not of limitation, such that the terminology or phraseology of the present specification is to be interpreted by the skilled artisan in light of the teachings and guidance.

The representative signal processing functions described herein (e.g. TX bonding processor, RX bonding processor, retransmission equalization module [REM], etc.) can be implemented in hardware, software, or some combination thereof. For instance, the signal processing functions can be implemented using computer processors, computer logic, application specific circuits (ASIC), digital signal processors, etc., as will be understood by those skilled in the arts based on the discussion given herein. Accordingly, any processor that performs the signal processing functions described herein is within the scope and spirit of the present invention.

Further, the signal processing functions described herein could be embodied by computer program instructions that are executed by a computer processor or any one of the hardware devices listed above. The computer program instructions cause the processor to perform the signal processing functions described herein. The computer program instructions (e.g. software) can be stored in a computer usable medium, computer program medium, or any storage medium that can be accessed by a computer or processor. Such media include a memory device such as a RAM or ROM, or other type of computer storage medium such as a computer disk or CD ROM, or the equivalent. Accordingly, any computer storage medium having computer program code that cause a processor to perform the signal processing functions described herein are within the scope and spirit of the present invention.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present invention.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising:
a bonding processor;
a first reception modem coupled to the bonding processor, wherein the first reception modem is in communication with a first transmission modem;
a second reception modem coupled to the bonding processor, wherein the second reception modem is in communication with a second transmission modem; and
a retransmission equalization module (REM) coupled to the second reception modem, wherein the REM is configured to:
detect a transmission error in data received from the first reception modem,
initiate a first retransmission of data from the first transmission modem responsive to detecting the transmission error in the data received from the first reception modem, and
initiate a second retransmission of data from the second transmission modem responsive to detecting the transmission error in the data received from the first reception modem.

2. The system of claim 1, wherein the first reception modem, second reception modern, first transmission modem, and second transmission modem are DSL modems.

3. The system of claim 1, wherein the REM is further configured to determine a first bit rate for data from the first reception modem and a second bit rate for data from the second reception modem.

4. The system of claim 3, wherein the REM is further configured to select the data for the second retransmission of data based on the determined first bit rate and second bit rate.

5. The system of claim 1, wherein the transmission error in the data is a transmission error in a first data transmission unit (DTU), and wherein the second retransmission of data is a retransmission of a second DTU.

6. The system of claim 1, wherein the REM is further configured to initiate the first retransmission of data simultaneously with the second retransmission of data.

7. A system comprising:
a first bonding processor;
a first transmission modem coupled to the first bonding processor;
a second transmission modem coupled to the first bonding processor; and
a retransmission equalization module (REM) coupled to the first transmission modem and the second transmission modem, wherein the REM is configured to:
detect a retransmission request sent to the first transmission modern,
initiate a first retransmission of data from the first transmission modem responsive to detecting the retransmission request, and
initiate a second retransmission of data from the second transmission modem responsive to detecting the retransmission request.

8. The system of claim 7, wherein the first transmission modem and second transmission modem are DSL modems.

9. The system of claim 7, wherein the REM is further configured to determine a first bit rate for data transmitted from the first transmission modem and a second bit rate for data transmitted from the second transmission modem.

10. The system of claim 9, wherein the REM is further configured to select the data for the second retransmission based on the determined first bit rate and second bit rate.

11. The system of claim 7, wherein the retransmission request is a retransmission request for a first data transmission unit (DTU), and wherein the second retransmission of data is a retransmission of a second DTU.

12. The system of claim 7, wherein the REM is further configured to simultaneously initiate the first retransmission and the second retransmission of data.

13. A method comprising:
receiving a first set of data over a first transmission line and a second set of data over a second transmission line;
detecting a transmission error in a first portion of the first set of data;
initiating a first retransmission of the first portion of the first set of data responsive to detecting the transmission error; and
initiating a second retransmission of a second portion of the second set of data responsive to detecting the transmission error.

14. The method of claim 13, further comprising:
detecting a retransmission request sent over the first transmission line; and
initiating the second retransmission of the second portion of the second set of data over the second transmission line responsive to detecting the retransmission request.

15. The method of claim 13, further comprising:
determining a first bit rate for data transmitted over the first transmission line; and
determining a second bit rate for data transmitted over the second transmission line.

16. The method of claim 15, further comprising selecting the second portion of the second set of data based on the determined first bit rate and second bit rate.

17. The method of claim 16, wherein the first portion of the first set of data is a first data transmission unit (DTU) in the first set of data, and wherein the second portion of the second set of data is a second DTU in the second set of data.

18. The method of claim 13, further comprising:
simultaneously initiating the first retransmission of the first portion of the first set of data and the second retransmission of the second portion of the second set of data responsive to detecting the transmission error.

19. The system of claim 7, further comprising:
a second bonding processor;
a first reception modem coupled to the second bonding processor, wherein the first reception modem is in communication with the first transmission modem;
a second reception modem coupled to the second bonding processor, wherein the second reception modem is in communication with the second transmission modem, wherein the REM is configured to:
initiate the first retransmission of data from the first transmission modem to the first reception modem, and
initiate, simultaneously with the first retransmission of data, the second retransmission of data from the second transmission modem to the second reception modem.

20. The system of claim 1, wherein the REM is further configured to:
instruct the bonding processor to stop receiving data when a buffer of the bonding processor has reached capacity.

21. The system of claim 20, wherein the REM is further configured to:
in response to the buffer reaching capacity, match a first delay over a first communications channel between the first transmission modem and the first reception modem and a second delay over a second communications channel between the second transmission modem and the second reception modem.

22. The system of claim 20, wherein the REM is further configured to:
in response to the buffer reaching capacity, initiate an extra retransmission of data from the first transmission modem or the second transmission modem.

23. The system of claim 1, wherein the bonding processor is directly coupled to the first reception modem and the second reception modem.

* * * * *

UNITED STATES PATENT AND TRADEMARK OFFICE
CERTIFICATE OF CORRECTION

PATENT NO.         : 8,971,391 B2
APPLICATION NO.    : 13/251079
DATED              : March 3, 2015
INVENTOR(S)        : Mike Locke It is certified that error appears in the above-identified patent and that said Letters Patent is hereby corrected as shown below:

In the claims

At Column 14, line 33, please replace "modern" with --modem--.

Signed and Sealed this
First Day of December, 2015

Michelle K. Lee
*Director of the United States Patent and Trademark Office*